(12) United States Patent
Lee et al.

(10) Patent No.: US 11,374,302 B2
(45) Date of Patent: Jun. 28, 2022

(54) WIRELESS SIGNAL DEVICE

(71) Applicant: Wistron NeWeb Corp., Hsinchu (TW)

(72) Inventors: Ming-Chan Lee, Hsinchu (TW);
Jun-Wei Wang, Hsinchu (TW);
Chao-Chun Lin, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 129 days.

(21) Appl. No.: 17/014,483

(22) Filed: Sep. 8, 2020

(65) Prior Publication Data

US 2021/0175604 A1   Jun. 10, 2021

(30) Foreign Application Priority Data

Dec. 6, 2019  (TW) ................................. 108144675

(51) Int. Cl.
*H01Q 1/24*  (2006.01)
*H01Q 1/22*  (2006.01)
*G06K 19/04*  (2006.01)

(52) U.S. Cl.
CPC ......... *H01Q 1/2225* (2013.01); *G06K 19/045* (2013.01); *H01Q 1/225* (2013.01)

(58) Field of Classification Search
CPC ............. G06K 19/045; G06K 19/0705; G06K 19/07345; G06K 19/07758; H01Q 1/1207; H01Q 1/2225; H01Q 1/225
See application file for complete search history.

(56) References Cited

U.S. PATENT DOCUMENTS

| | | | |
|---|---|---|---|
| 6,404,643 B1* | 6/2002 | Chung | B32B 3/08 257/679 |
| 8,593,258 B2 | 11/2013 | Cheng | |
| 2007/0095913 A1* | 5/2007 | Takahashi | H01Q 7/00 235/492 |
| 2009/0278687 A1* | 11/2009 | Kato | G06K 19/07756 340/572.1 |
| 2010/0018640 A1* | 1/2010 | Simons | H01Q 1/40 156/230 |
| 2010/0038437 A1* | 2/2010 | Kato | G06K 19/07783 235/492 |
| 2012/0055013 A1* | 3/2012 | Finn | H01Q 1/2225 29/600 |

(Continued)

FOREIGN PATENT DOCUMENTS

| | | |
|---|---|---|
| TW | 201039244 A | 11/2010 |
| TW | I386855 B | 2/2013 |
| TW | I394081 B1 | 4/2013 |

*Primary Examiner* — Thien M Le
(74) *Attorney, Agent, or Firm* — McClure, Qualey & Rodack, LLP

(57) ABSTRACT

A wireless signal device is provided. The wireless signal device includes a device body, a fastening belt, a wireless signal module and a switch unit. The device body includes a through hole. A fixed end of the fastening belt is affixed to the device body, and a free end of the fastening belt is adapted to be inserted into the through hole. The wireless signal module is disposed in the device body. The switch unit is disposed in the device body, wherein in a signal transmission mode, the fastening belt passes through the through hole, and the switch unit is pressed by the fastening belt to activate the wireless signal module.

13 Claims, 11 Drawing Sheets

(56) References Cited

U.S. PATENT DOCUMENTS

| | | | |
|---|---|---|---|
| 2014/0209691 A1* | 7/2014 | Finn | H01F 27/363 235/492 |
| 2015/0077257 A1* | 3/2015 | Pokrajac | G01V 15/00 340/572.8 |
| 2018/0293480 A1* | 10/2018 | Osamura | G06K 19/0775 |

* cited by examiner

WIRELESS SIGNAL DEVICE

CROSS REFERENCE TO RELATED APPLICATIONS

This application claims priority of Taiwan Patent Application No. 108144675, filed on Dec. 6, 2019, the entirety of which is incorporated by reference herein.

BACKGROUND OF THE INVENTION

Field of the Invention

The present invention relates to a wireless signal device, and in particular to a wireless signal device with a fastening belt.

Description of the Related Art

Conventional wireless tags are mostly radio frequency identification tags, which can be attached to objects. By scanning its radio frequency identification tag, data about an object can be read. However, for tracing production equipment or tracing warehoused goods, active-type tags such as Bluetooth tags are required so that wireless signals are continuously provided. The Bluetooth tag needs a battery to provide electricity. The battery of a Bluetooth tag may be exhausted before use, due to the power switch being unexpectedly switched on.

BRIEF SUMMARY OF THE INVENTION

Embodiments of the invention are provided to address the aforementioned difficulty.

In one embodiment, a wireless signal device is provided. The wireless signal device includes a device body, a fastening belt, a wireless signal module, and a switch unit. The device body includes a through hole. The fixed end of the fastening belt is affixed to the device body. The free end of the fastening belt is adapted to be inserted into the through hole. The wireless signal module is disposed in the device body. The switch unit is disposed in the device body. In a signal transmission mode, the fastening belt passes through the through hole, and the switch unit is pressed by the fastening belt to activate the wireless signal module.

In one embodiment, the switch unit comprises a first conductive sheet and a second conductive sheet. When the fastening belt is not inserted into the through hole, the first conductive sheet is separated from the second conductive sheet. When the fastening belt passes through the through hole, the fastening belt pushes the first conductive sheet to contact the second conductive sheet.

In one embodiment, the wireless signal device also comprises a hook. The fastening belt comprises a first belt surface, a second belt surface and a plurality of ratchets. The first belt surface is opposite the second belt surface. The ratchets are formed on the first belt surface. When the fastening belt passes through the through hole, the hook is wedged to the ratchets, and the second belt surface pushes the first conductive sheet to contact the second conductive sheet.

In one embodiment, the wireless signal device also comprises a battery. The wireless signal module comprises a module substrate. The first conductive sheet and the second conductive sheet are connected to the module substrate. The first electrode of the battery is coupled to the first conductive sheet via the module substrate. The second electrode of the battery is coupled to the second conductive sheet via the module substrate.

In one embodiment, the module substrate comprises a first substrate surface and the second substrate surface. The first substrate surface is opposite the second substrate surface. The first conductive sheet is disposed on the first substrate surface. The second conductive sheet is disposed on the second substrate surface.

In one embodiment, when the fastening belt passes through the through hole in the first direction, the fastening belt presses the first conductive sheet, and the first conductive sheet contacts the second conductive sheet in the first direction.

In one embodiment, the first conductive sheet comprises a round portion, the second conductive sheet comprises a protrusion, and when the fastening belt passes through the through hole, the fastening belt presses the round portion of the first conductive sheet, and the first conductive sheet contacts the protrusion of the second conductive sheet.

In one embodiment, the wireless signal device further comprises a power conductor, and the power conductor connects the first electrode of the battery to the module substrate.

In one embodiment, the wireless signal device also comprises a spacer, wherein the device body comprises a first chamber and a second chamber. The spacer is located between the first chamber and the second chamber. A through hole is formed in the first chamber. The wireless signal module and the battery are disposed in the second chamber. The first conductive sheet and the second conductive sheet extend from the second chamber to the first chamber through the spacer.

In one embodiment, the device body further comprises a waterproof groove, and the waterproof groove surrounds at least a portion of the second chamber.

In one embodiment, the waterproof groove has a notch, and the spacer is located in the notch.

In one embodiment, the wireless signal device further comprises a belt circuit, at least a portion of which extends into the fastening belt. The belt circuit extends from the fixed end to the free end, and then from the free end back to the fixed end. The belt circuit comprises a first circuit end and a second circuit end. The first circuit end and the second circuit end are coupled to the module substrate.

In one embodiment, the module substrate comprises a first trace line, a second trace line, and a third trace line. The first trace line is coupled to the first electrode and the first conductive sheet. The second trace line is coupled to the second electrode and the first circuit end. The third trace line is coupled to the second circuit end and the second conductive sheet.

In one embodiment, the wireless signal module comprises an antenna, and the wireless signal module is adapted to send a wireless signal via the antenna.

Utilizing the wireless signal device of the embodiment of the invention, the wireless signal module is activated only when the fasten belt passes through the through hole. Therefore, the wireless signal device (for example, a Bluetooth tag) is prevented from being electricity exhausted before use. Additionally, in one embodiment, the wireless signal device has a belt circuit. When the fastening belt is cut maliciously, the location where the signal disappeared can be traced immediately, and the anti-theft ability of the wireless signal device is improved.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
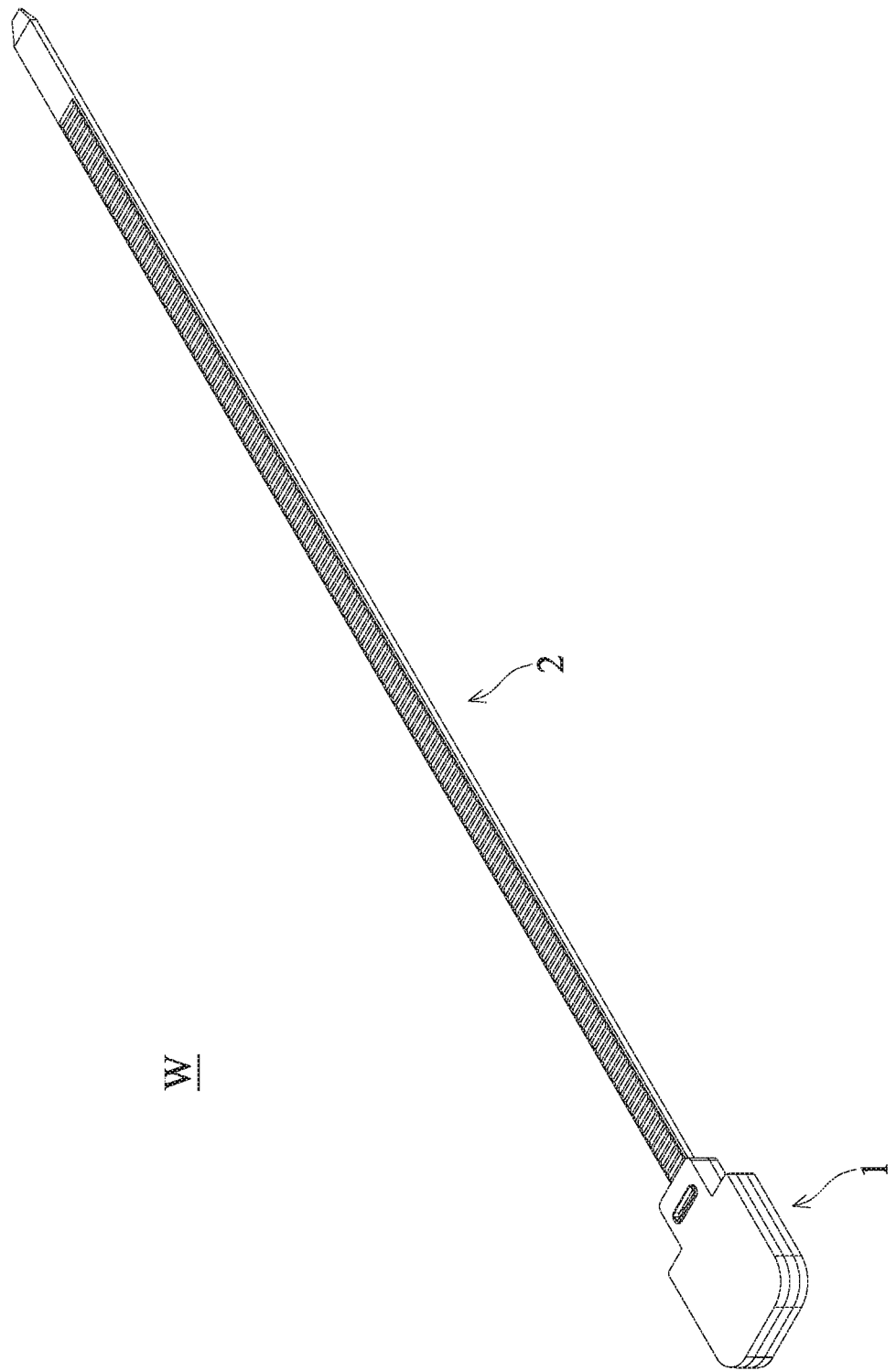
FIG. 1A is a perspective view of a wireless signal device of an embodiment of the invention, wherein the fastening belt is not inserted into the through hole.
Figure 1B:
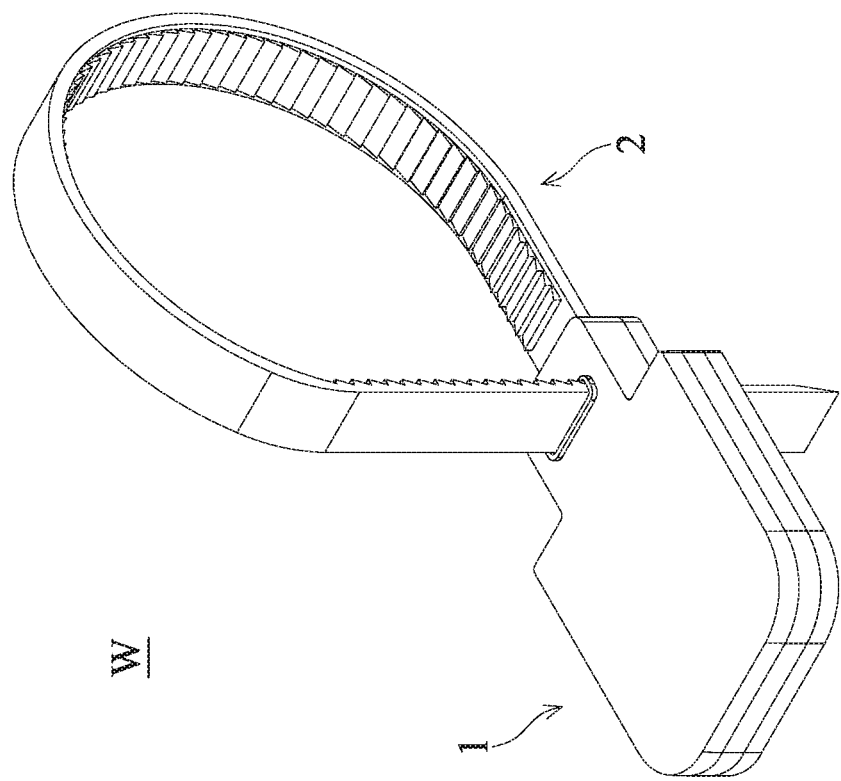
FIG. 1B is a perspective view of the wireless signal device of the embodiment of the invention, wherein the fastening belt is inserted into the through hole.
Figure 2A:
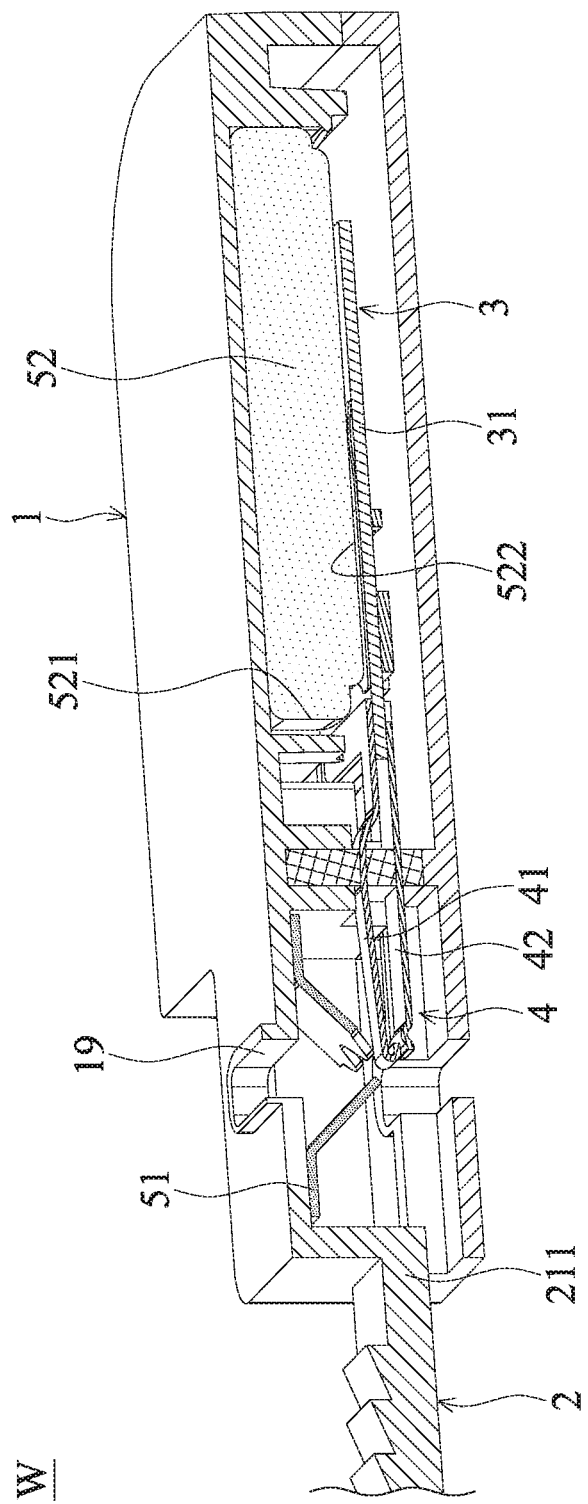
FIG. 2A is a cross sectional view of the wireless signal device of the embodiment of the invention, wherein the fastening belt is not inserted into the through hole.
Figure 2B:
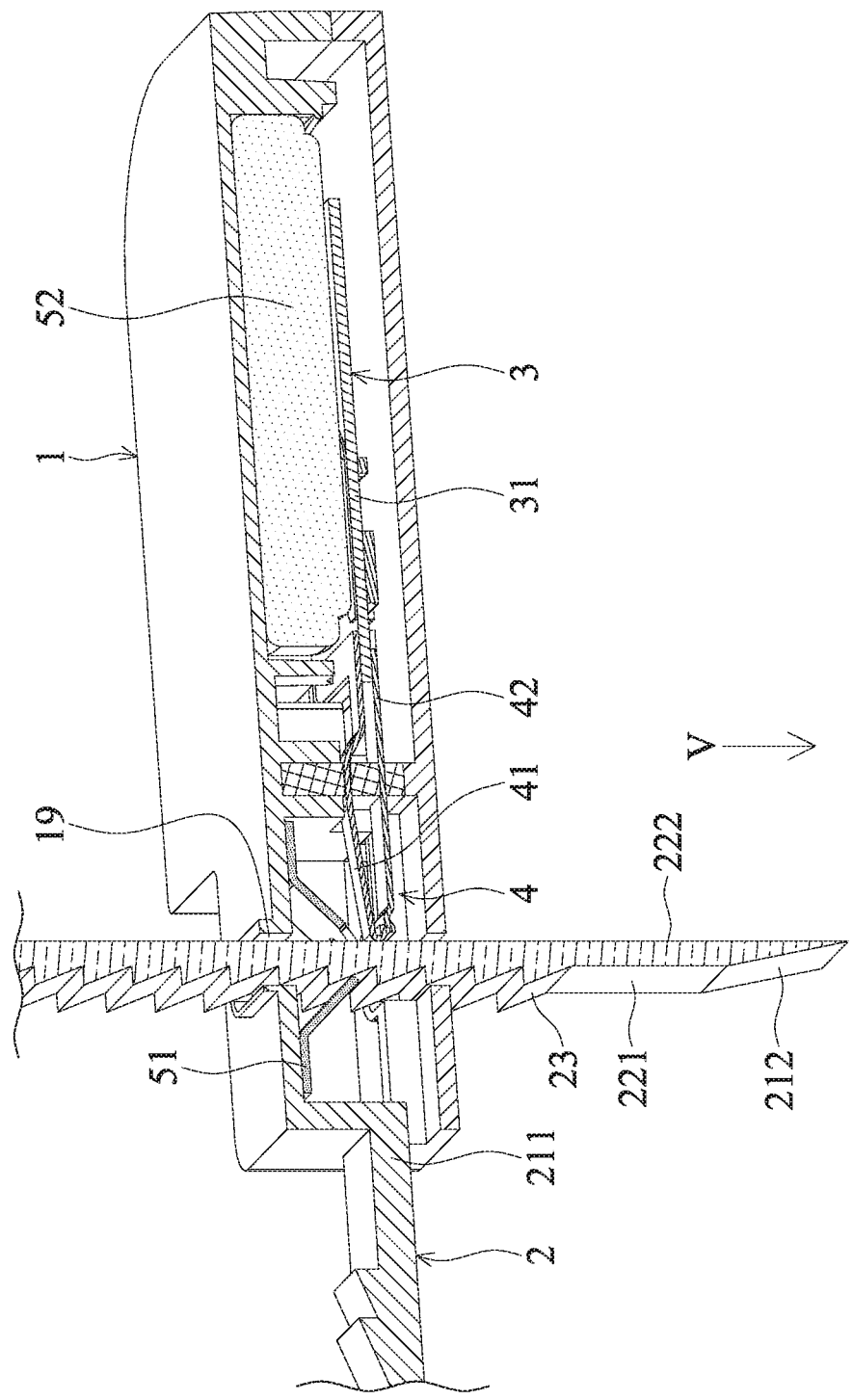
FIG. 2B is a cross sectional view of the wireless signal device of the embodiment of the invention, wherein the fastening belt is inserted into the through hole.

FIGS. 1A and 1B are perspective views of a wireless signal device of an embodiment of the invention. FIGS. 2A and 2B are cross sectional views of the wireless signal device of an embodiment of the invention. With reference to FIGS. 1A, 1B, 2A and 2B, the wireless signal device W of the embodiment of the invention includes a device body 1, a fastening belt 2, a wireless signal module 3 and a switch unit 4. The device body 1 includes a through hole 19. The fixed end 211 of the fastening belt 2 is affixed to the device body 1, and the free end 212 of the fastening belt 2 is adapted to be inserted into the through hole 19. The wireless signal module 3 is disposed in the device body 1. The switch unit 4 is disposed in the device body 1. With reference to FIGS. 1B and 2B, in a signal transmission mode, the fastening belt 2 passes through the through hole 19, and the switch unit 4 is pressed by the fastening belt 2 to activate the wireless signal module 3.

With reference to FIGS. 2A and 2B, in one embodiment, the switch unit 4 comprises a first conductive sheet 41 and a second conductive sheet 42. When the fastening belt 2 is not inserted into the through hole 19 (FIG. 2A), the first conductive sheet 41 is separated from the second conductive sheet 42. When the fastening belt 2 passes through the through hole 19 (FIG. 2B), the fastening belt 2 pushes the first conductive sheet 41 to contact the second conductive sheet 42.

Figure 3A:
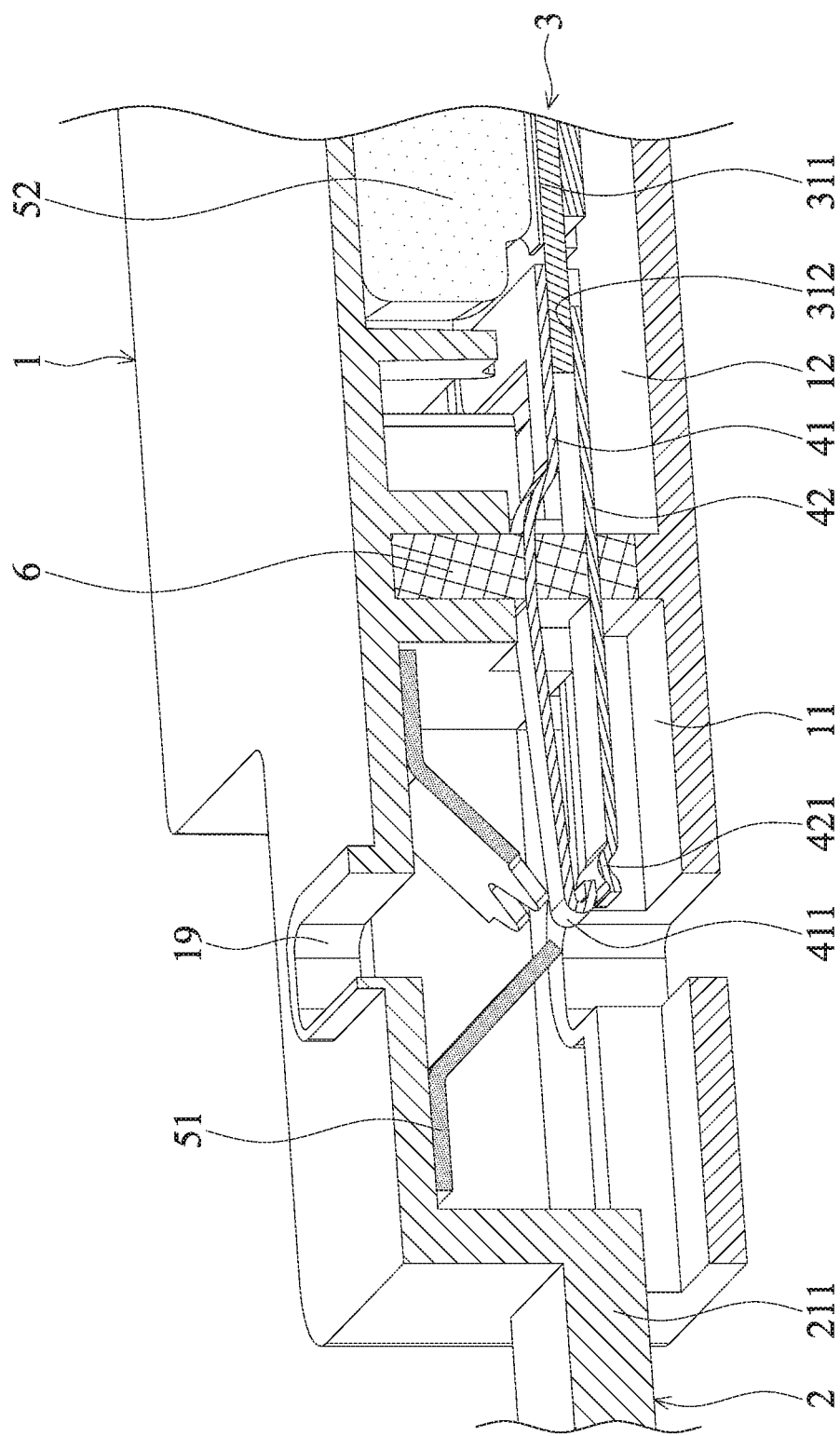
FIG. 3A shows a portion of the wireless signal device of the embodiment of the invention, wherein the fastening belt is not inserted into the through hole.
Figure 3B:
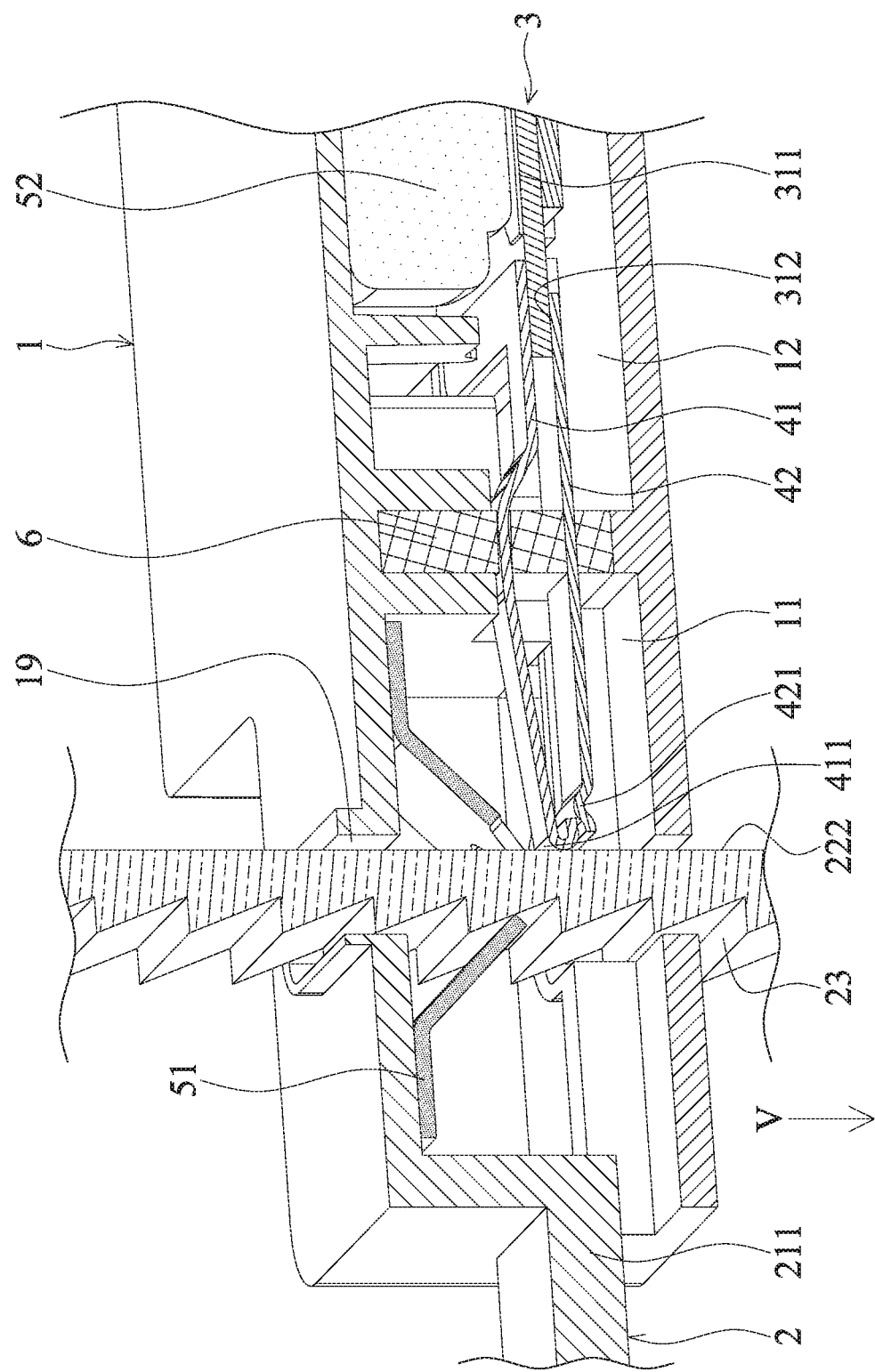
FIG. 3B shows a portion of the wireless signal device of the embodiment of the invention, wherein the fastening belt is inserted into the through hole.

FIGS. 3A and 3B show a portion of the wireless signal device of the embodiment of the invention. With reference to FIGS. 2B, 3A and 3B, in one embodiment, the wireless signal device W further comprises a hook 51. The fastening belt 2 comprises a first belt surface 221, a second belt surface 222 and a plurality of ratchets 23. The first belt surface 221 is opposite the second belt surface 222. The ratchets 23 are formed on the first belt surface 221. When the fastening belt 2 passes through the through hole 19, the hook 51 is wedged to the ratchets 23, and the second belt surface 222 pushes the first conductive sheet 41 to contact the second conductive sheet 42.

With reference to FIGS. 2A and 2B, in one embodiment, the wireless signal device W further comprises a battery 52. The wireless signal module 3 comprises a module substrate 31. The first conductive sheet 41 and the second conductive sheet 42 are connected to the module substrate 31. A first electrode 521 of the battery 52 is coupled to the first conductive sheet 41 via the module substrate 31. A second electrode 522 of the battery 52 is coupled to the second conductive sheet 42 via the module substrate 31.

With reference to FIGS. 2A and 2B, in one embodiment, the module substrate 31 comprises a first substrate surface 311 and the second substrate surface 312. The first substrate surface 311 is opposite the second substrate surface 312. The first conductive sheet 41 is disposed on the first substrate surface 311, and the second conductive sheet 42 is disposed on the second substrate surface 312.

With reference to FIGS. 3A and 3B, in one embodiment, when the fastening belt 2 passes through the through hole 19 in a first direction V, the fastening belt 2 presses the first conductive sheet 41, and the first conductive sheet 41 contacts the second conductive sheet 42 in the first direction V.

With reference to FIGS. 3A and 3B, in one embodiment, the first conductive sheet 41 comprises a round portion 411. The second conductive sheet 42 comprises a protrusion 421. When the fastening belt 2 passes through the through hole 19, the fastening belt 2 presses the round portion 411 of the first conductive sheet 41, and the first conductive sheet 41 contacts the protrusion 421 of the second conductive sheet 42.

Figure 4:
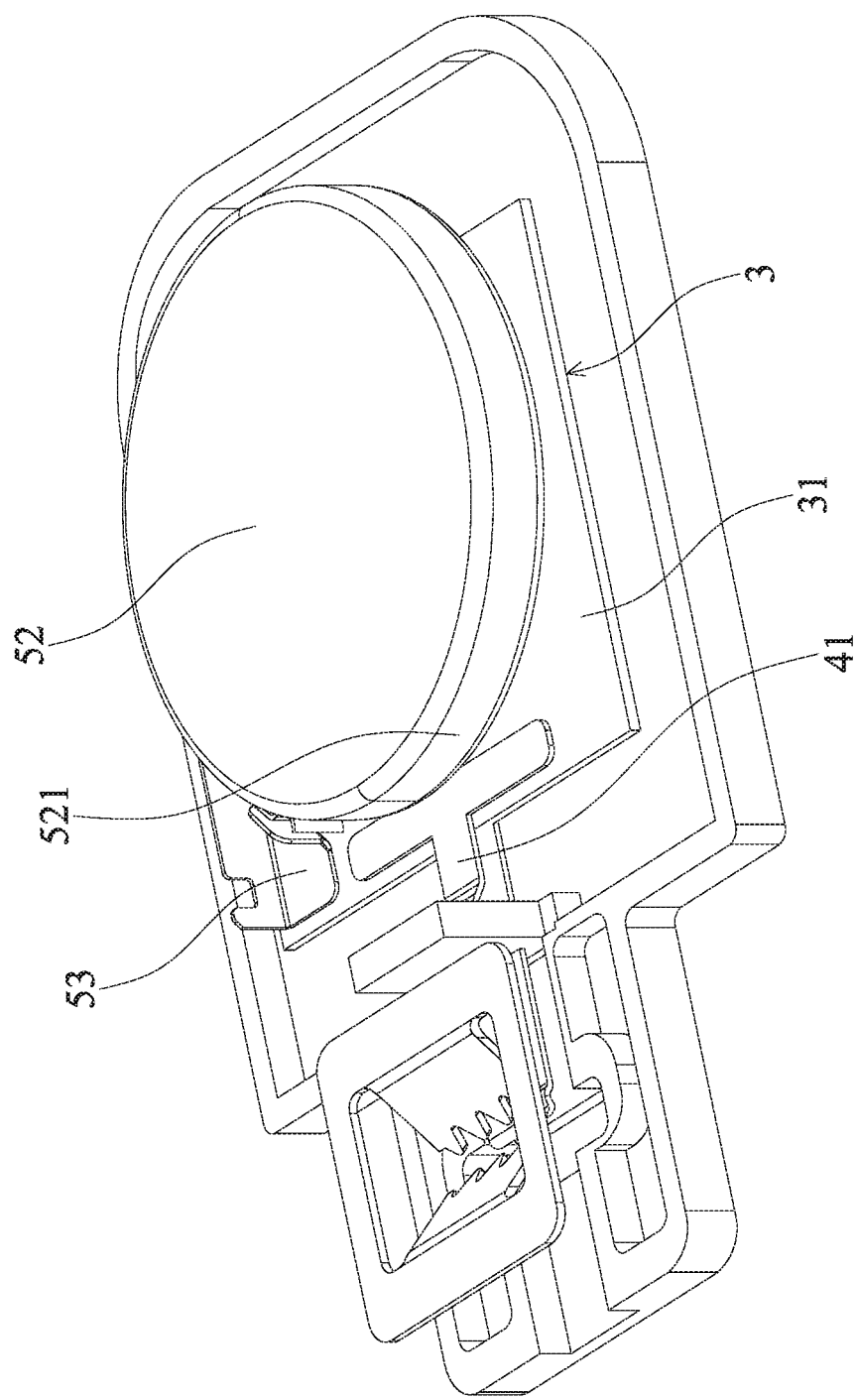
FIG. 4 shows the battery and the wireless signal module of the embodiment of the invention.

FIG. 4 shows the battery and the wireless signal module of the embodiment of the invention. With reference to FIG. 4, in one embodiment, the wireless signal device further comprises a power conductor 53, and the power conductor 53 connects the first electrode 521 of the battery 52 to the module substrate 31.

With reference to FIGS. 3A and 3B, in one embodiment, the wireless signal device further comprises a spacer 6. The device body 1 comprises a first chamber 11 and a second chamber 12. The spacer 6 is located between the first chamber 11 and the second chamber 12. The through hole 19 is formed in the first chamber 11. The wireless signal module 3 and the battery 52 are disposed in the second chamber 12. The first conductive sheet 41 and the second conductive sheet 42 extend from the second chamber 12 to the first chamber 11 through the spacer 6. In one embodiment, the first conductive sheet 41 and the second conductive sheet 42 are wedged to the spacer 6.

Figure 5:
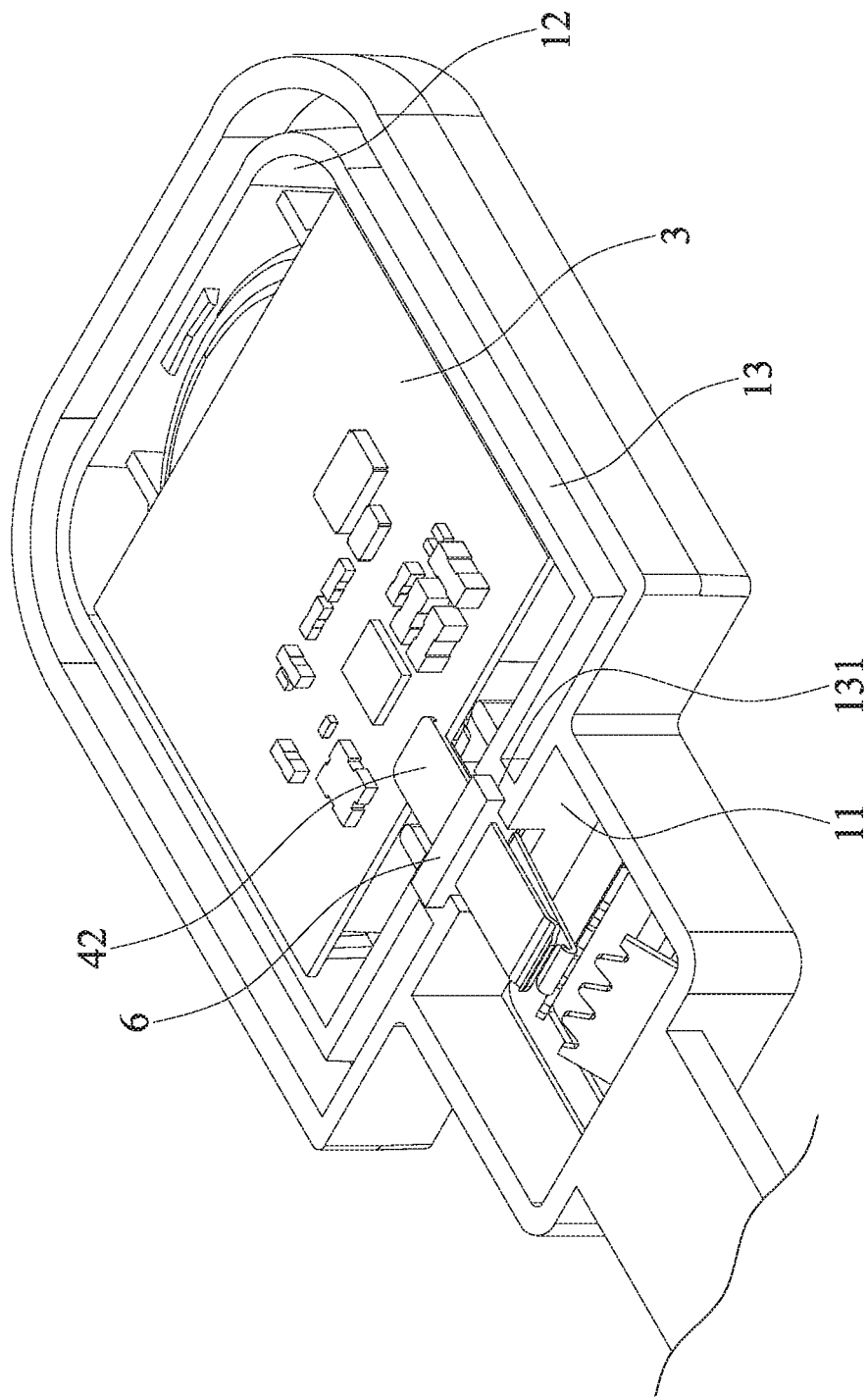
FIG. 5 shows a portion of the device body of the embodiment of the invention.

FIG. 5 shows a portion of the device body 1 of the embodiment of the invention. With reference to FIGS. 3A, 3B and 5, in one embodiment, the device body 1 further comprises a waterproof groove 13, and the waterproof groove 13 surrounds at least a portion of the second chamber 12.

With reference to FIG. 5, in one embodiment, the waterproof groove 13 has a notch 131, and the spacer 6 is located in the notch 131.

In one embodiment of the invention, the spacer 6 can be made of rubber or other waterproof materials. Utilizing the waterproof groove 13 and the spacer 6, the water and dust are prevented from entering the second chamber 12. In one embodiment, the waterproof groove 13 can be filled with waterproof glue to improve waterproof effect of the waterproof groove 13.

Figure 6A:
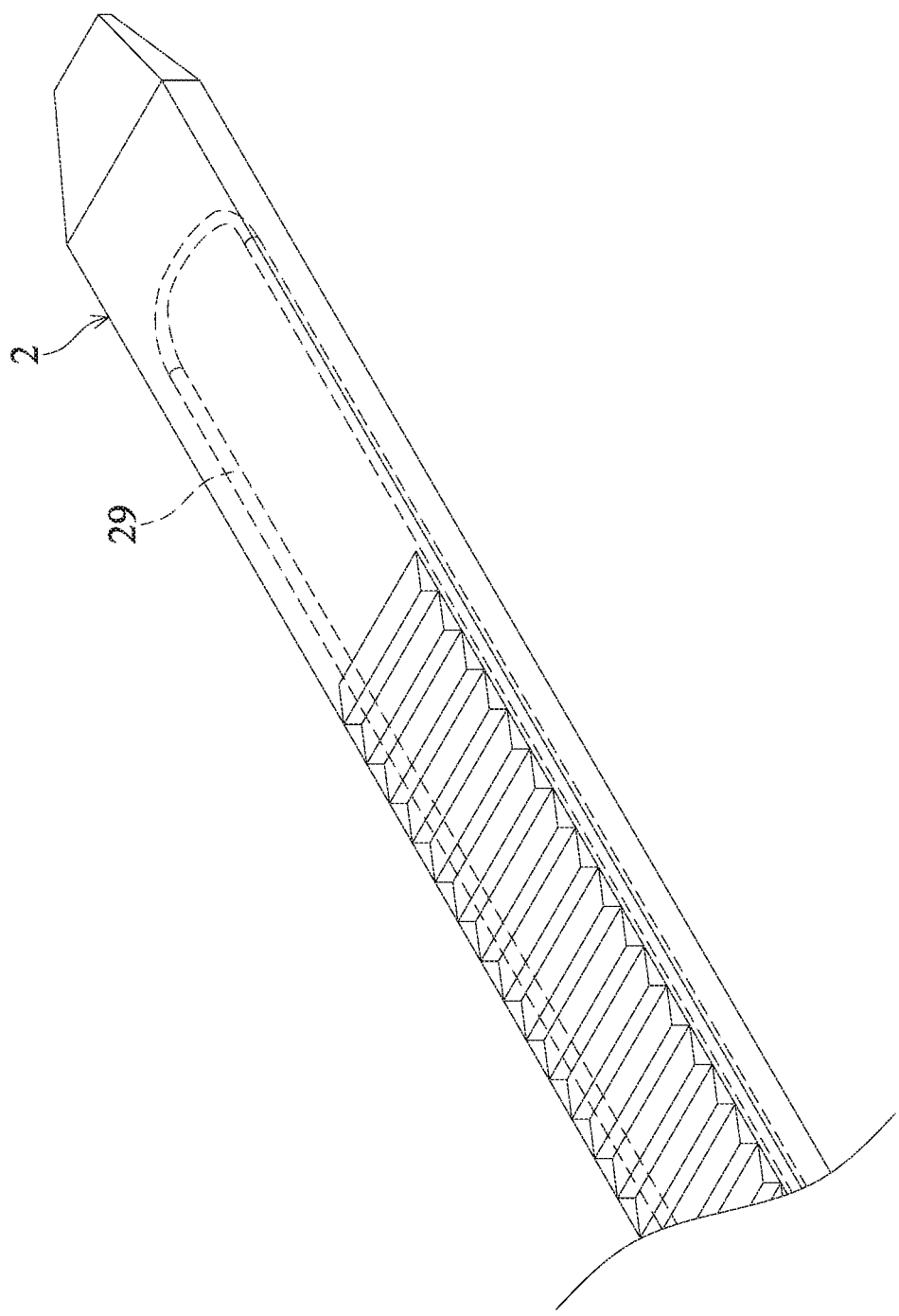
FIG. 6A shows a wireless signal device of another embodiment of the invention.
Figure 6B:
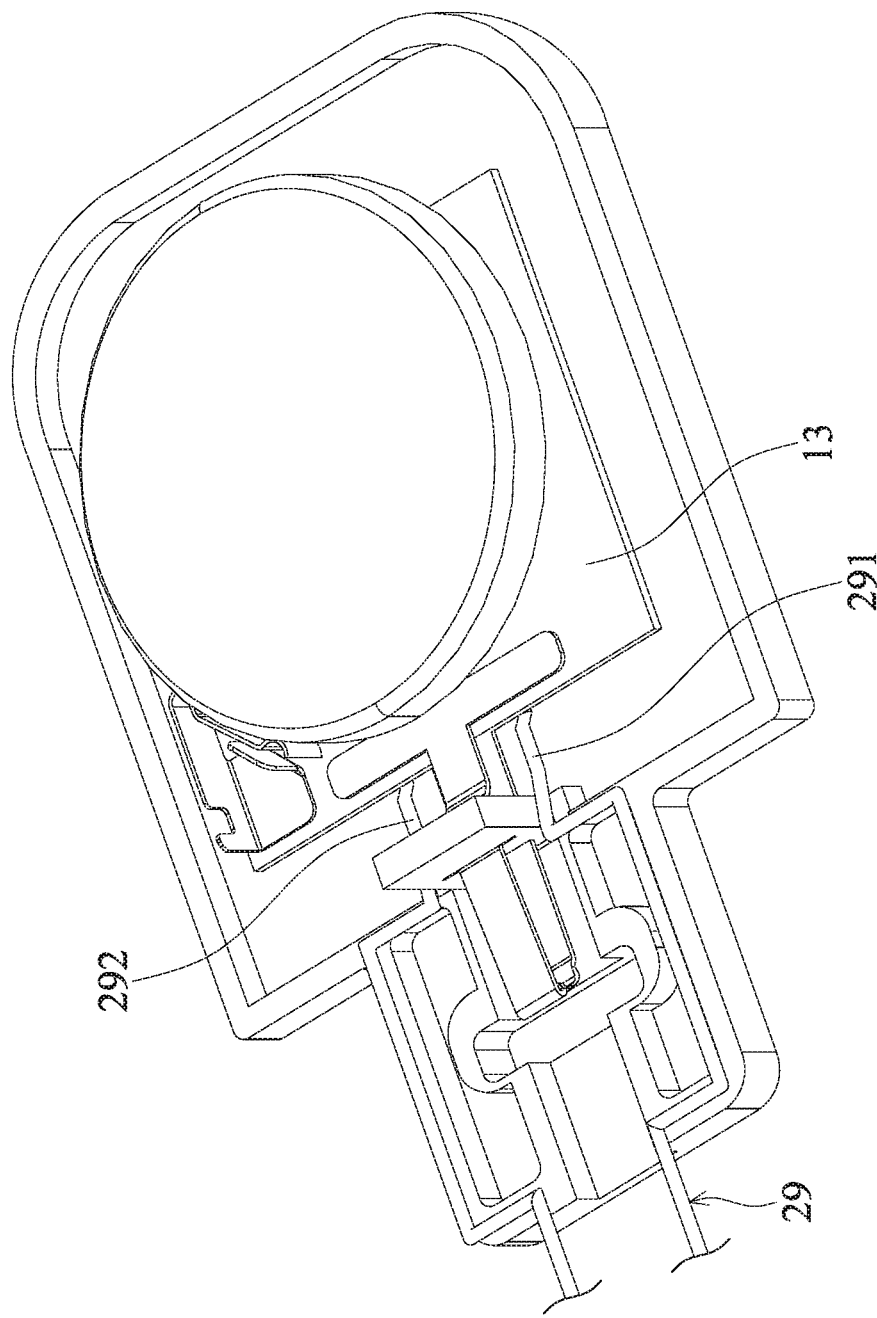
FIG. 6B shows the first circuit end and the second circuit end coupled to the module substrate of the embodiment of FIG. 6B.

FIG. 6A shows a wireless signal device W of another embodiment of the invention. With reference to FIG. 6A, in this embodiment, the wireless signal device further comprises a belt circuit 29. At least a portion of the belt circuit 29 extends into the fastening belt 2. The belt circuit 29 extends from the fixed end 211 to the free end 212, and then extends from the free end 212 back to the fixed end 211. The belt circuit 29 comprises a first circuit end 291 and a second circuit end 292. With reference to FIG. 6B, the first circuit end 291 and the second circuit end 292 are coupled to the module substrate 31.

Figure 6C:
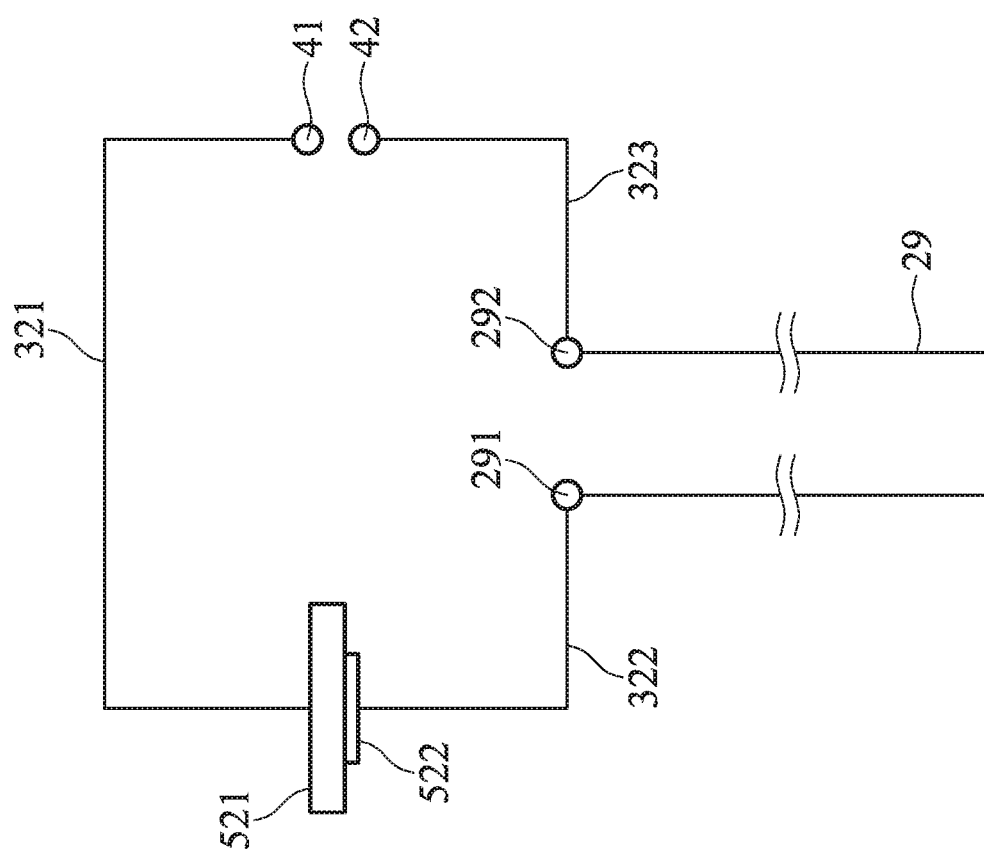
FIG. 6C shows the system circuit of the embodiment of FIG. 6B.

With reference to FIG. 6C, in one embodiment, the module substrate 31 comprises a first trace line 321, a second trace line 322 and a third trace line 323. The first trace line 321 is coupled to the first electrode 521 and the first conductive sheet 41. The second trace line 322 is coupled to the second electrode 522 and the first circuit end 291. The third trace line 323 is coupled to the second circuit end 292 and the second conductive sheet 42.

In the embodiment shown in FIGS. 6A, 6B and 6C, when the fastening belt is cut off, the belt circuit 29 is broken, and the wireless signal module 3 is shut down.

In one embodiment, the wireless signal module comprises an antenna, and the wireless signal module is adapted to send a wireless signal via the antenna.

Utilizing the wireless signal device of the embodiment of the invention, the wireless signal module is activated only when the fasten belt passes through the through hole. Therefore, the wireless signal device (for example, a Bluetooth tag) is prevented from being electricity exhausted before use. Additionally, in one embodiment, the wireless signal device has a belt circuit. When the fastening belt is cut maliciously, the location where the signal disappeared can be traced immediately, and the anti-theft ability of the wireless signal device is improved.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A wireless signal device, comprising:
   a device body, comprising a through hole;
   a fastening belt, wherein a fixed end of the fastening belt is affixed to the device body, and a free end of the fastening belt is adapted to be inserted into the through hole;
   a wireless signal module, disposed in the device body; and
   a switch unit, disposed in the device body, wherein in a signal transmission mode, the fastening belt passes through the through hole, and the switch unit is pressed by the fastening belt to activate the wireless signal module,
   wherein the switch unit comprises a first conductive sheet and a second conductive sheet, and when the fastening belt is not inserted into the through hole, the first conductive sheet is separated from the second conductive sheet, and when the fastening belt passes through the through hole, the fastening belt pushes the first conductive sheet to contact the second conductive sheet.

2. The wireless signal device as claimed in claim 1, further comprising a hook, wherein the fastening belt comprises a first belt surface, a second belt surface and a plurality of ratchets, the first belt surface is opposite the second belt surface, the ratchets are formed on the first belt surface, and when the fastening belt passes through the through hole, the hook is wedged to the ratchets, and the second belt surface pushes the first conductive sheet to contact the second conductive sheet.

3. The wireless signal device as claimed in claim 1, further comprising a battery, wherein the wireless signal module comprises a module substrate, the first conductive sheet and the second conductive sheet are connected to the module substrate, a first electrode of the battery is coupled to the first conductive sheet via the module substrate, and a second electrode of the battery is coupled to the second conductive sheet via the module substrate.

4. The wireless signal device as claimed in claim 3, wherein the module substrate comprises a first substrate surface and the second substrate surface, the first substrate surface is opposite the second substrate surface, the first conductive sheet is disposed on the first substrate surface, and the second conductive sheet is disposed on the second substrate surface.

5. The wireless signal device as claimed in claim 4, wherein when the fastening belt passes through the through hole in a first direction, the fastening belt presses the first conductive sheet, and the first conductive sheet contacts the second conductive sheet in the first direction.

6. The wireless signal device as claimed in claim 5, wherein the first conductive sheet comprises a round portion, the second conductive sheet comprises a protrusion, and when the fastening belt passes through the through hole, the fastening belt presses the round portion of the first conductive sheet, and the first conductive sheet contacts the protrusion of the second conductive sheet.

7. The wireless signal device as claimed in claim 3, further comprising a power conductor, the power conductor connects the first electrode of the battery to the module substrate.

8. The wireless signal device as claimed in claim 3, further comprising a spacer, wherein the device body comprises a first chamber and a second chamber, the spacer is located between the first chamber and the second chamber, a through hole is formed in the first chamber, the wireless signal module and the battery are disposed in the second chamber, and the first conductive sheet and the second conductive sheet extend from the second chamber to the first chamber through the spacer.

9. The wireless signal device as claimed in claim 8, wherein the device body further comprises a waterproof groove, and the waterproof groove surrounds at least a portion of the second chamber.

10. The wireless signal device as claimed in claim 9, wherein the waterproof groove has a notch, and the spacer is located in the notch.

11. The wireless signal device as claimed in claim 8, further comprising a belt circuit, wherein at least a portion of the belt circuit extends into the fastening belt, wherein the belt circuit extends from the fixed end to the free end, and then extends from the free end back to the fixed end, the belt circuit comprises a first circuit end and a second circuit end, and the first circuit end and the second circuit end are coupled to the module substrate.

12. The wireless signal device as claimed in claim 11, wherein the module substrate comprises a first trace line, a second trace line, and a third trace line, the first trace line is coupled to the first electrode and the first conductive sheet, the second trace line is coupled to the second electrode and the first circuit end, and the third trace line is coupled to the second circuit end and the second conductive sheet.

13. The wireless signal device as claimed in claim 1, wherein the wireless signal module comprises an antenna, and the wireless signal module is adapted to send a wireless signal via the antenna.

* * * * *